US009753659B2

(12) United States Patent
Hasegawa et al.

(10) Patent No.: US 9,753,659 B2
(45) Date of Patent: *Sep. 5, 2017

(54) GENERATING ENUMERATED INFORMATION IN WHICH A PLURALITY OF FILES ARE ENUMERATED IN A SEQUENTIAL MEDIUM

(71) Applicant: International Business Machines Corporation, Armonk, NY (US)

(72) Inventors: Tohru Hasegawa, Sagamihara (JP); Takamasa Hirata, Kodaira (JP); Naoki Imai, Yokohama (JP); Masanori Kamiya, Koutoh (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,814

(22) Filed: Feb. 1, 2016

(65) Prior Publication Data
US 2016/0188236 A1 Jun. 30, 2016

Related U.S. Application Data

(63) Continuation of application No. 14/627,554, filed on Feb. 20, 2015, now Pat. No. 9,280,556, which is a continuation of application No. 13/648,658, filed on Oct. 10, 2012, now Pat. No. 9,002,807.

(30) Foreign Application Priority Data

Nov. 8, 2011 (JP) .................. 2011-244961

(51) Int. Cl.
*G06F 7/00* (2006.01)
*G06F 17/30* (2006.01)
(Continued)

(52) U.S. Cl.
CPC ............ *G06F 3/0619* (2013.01); *G06F 3/065* (2013.01); *G06F 3/0643* (2013.01);
(Continued)

(58) Field of Classification Search
None
See application file for complete search history.

(56) References Cited

U.S. PATENT DOCUMENTS 6,886,019 B1  4/2005 Cannon et al.
7,552,115 B2 * 6/2009 Kalach .................. G06F 3/0605
(Continued)

FOREIGN PATENT DOCUMENTS

JP       02-246075 A     10/1990
JP       06119213 A      4/1994
(Continued)

OTHER PUBLICATIONS

U.S. Appl. No. 13/648,658.
U.S. Appl. No. 14/627,554.

*Primary Examiner* — Uyen Le
(74) *Attorney, Agent, or Firm* — Francis Lammes; Stephen J. Walder, Jr.; Randall J. Bluestone (57) ABSTRACT

A mechanism is provided for generating enumerated information in which a plurality of files is enumerated except entirely-invalidated files on a sequential medium. Management information for managing locations where the plurality of files on the sequential medium are recorded is acquired from the sequential medium. The enumerated information in which the plurality of files are enumerated is generated in an order according to the locations where the plurality of files are recorded on the basis of the acquired management information.

12 Claims, 9 Drawing Sheets

(51) Int. Cl.
    *G06F 3/06*           (2006.01)
    *G11B 27/032*       (2006.01)
    *G11B 27/10*         (2006.01)
    *G11B 27/32*         (2006.01)
    *G11B 5/008*         (2006.01)
    *G11B 5/09*          (2006.01)

(52) U.S. Cl.
    CPC ...... *G06F 3/0685* (2013.01); *G06F 17/30091* (2013.01); *G06F 17/30179* (2013.01); *G06F 17/30218* (2013.01); *G11B 5/00817* (2013.01); *G11B 27/032* (2013.01); *G11B 27/107* (2013.01); *G11B 27/328* (2013.01); *G11B 5/09* (2013.01); *G11B 2220/95* (2013.01)

(56) References Cited

U.S. PATENT DOCUMENTS

| | | |
|---|---|---|
| 7,634,627 B1 | 12/2009 | Ohr et al. |
| 8,209,298 B1 | 6/2012 | Anglin et al. |
| 2004/0003171 A1 | 1/2004 | Basham et al. |
| 2008/0052293 A1 | 2/2008 | Coverston et al. |

FOREIGN PATENT DOCUMENTS

| | | |
|---|---|---|
| JP | 2001118365 A | 4/2001 |
| JP | 2010-097646 A | 4/2010 |
| JP | 2011113605 A | 6/2011 |

\* cited by examiner

GENERATING ENUMERATED INFORMATION IN WHICH A PLURALITY OF FILES ARE ENUMERATED IN A SEQUENTIAL MEDIUM

BACKGROUND

The present invention relates to a device and method for generating information in which a plurality of files are enumerated. Particularly, the present invention relates to a device and method for generating information in which a plurality of files on a sequential medium are enumerated.

In the case of copying a plurality of files or scanning a plurality of files for computer viruses, the plurality of files is sequentially read from a storage. In this process, if the storage is a random-accessible medium such as a hard disk drive (HDD) or a universal serial bus (USB) memory, the order of accessing the files does not make any difference.

If the storage is a sequentially-accessed medium, such as a tape, however, it may require a long period of time for reading the plurality of files depending on the order of accessing the files in some cases.

Actually, even in the case of using a linear tape file system (LTFS), which is a standard file system on a tape conforming to the Linear Tape-Open (LTO) standard, the performance (a required period of time) largely depends on the order of copying the files if the locations where the files are recorded are not sequential on the tape when the files on the LTFS are copied into the HDD.

For example, it is assumed that a file A, a file B, and a file C are written in this order in a tape. In this case, if the file A, the file B, and the file C are accessed in this order, the files are able to be read at a speed of maximum 140 MB/s in the LTO fifth generation. If the file C, the file B, and the file A are accessed in this order, however, the files may be able to be read at a speed of only several MB/s or so in some cases.

As described above, the order of accessing files is largely related to the performance in the case of copying the files in the LTFS into the HDD.

There is known a technique described in an official gazette for improving the efficiency of accessing files by considering the order of the accessed files (for example, refer to Japanese Patent Application Publication No. JP2010-97646A).

In Japanese Patent Application Publication No. JP2010-97646A, a tape drive controller includes a tape running control unit which controls the running of a tape, a read/write control unit which controls a head, and a seek management table in which seek times from the beginning of tape (BOT) are registered in the order of written files. In the seek management table, seek time is provisionally registered with respect to a file whose seek time is unconfirmed. If the seek information is confirmed afterward, the confirmed seek time is registered. When a request is made to read a plurality of files, the tape running control unit controls the running of the tape to enable the head to access the plurality of files requested to be read in ascending order of the seek time by referring to the seek management table.

In addition to the above, there have been suggested other various techniques described in official gazettes for speeding up the access to files (for example, refer to Japanese Patent Application Publication No. JP02-246075).

Japanese Patent Application Publication No. JP02-246075 discloses a configuration in which a file management information block is provided before the BOT of a magnetic tape volume, a file name and location information are written into the file management information block, and the position of the head is determined by referring to the file name and location information when accessing a file.

SUMMARY

A general operation in copying files is as described below. Specifically, for example, in the case of Windows 7®, a directory including a plurality of files is copied by normally selecting the directory by Explorer® and then dragging and dropping the directory onto a copy destination or inputting an xcopy command from a command prompt. Thereafter, in either case of performing the drag-and-drop operation and the input operation of the xcopy command, the files in the directory are enumerated and the files are copied in order.

More specifically, the application (Explorer®, xcopy, etc.) queries the operating system (OS) by calling an application program interface (API) before copying the files. Thereupon, the OS queries a file system by using an I/O request packet (IRP). In response to this, the file system enumerates and sends back the file names of the files under the directory, which is to be copied, into a buffer prepared by the IRP. In this process, the file system counts internally-used file IDs in order from zero and enumerates the files in the directory as files corresponding to the respective file IDs.

Note that, however, there is no clear rule for determining which file in the directory is associated with each file ID. Specifically, the order in which the file names in the directory are enumerated in the case of enumerating the files depends on the implementation of the file system. For example, an NT file system (NTFS), which is normal in Windows®, enumerates the files names in alphabetical order and, in LTFS versions 1 and 2, enumerates the file names in the order of file creation.

Here, description will be made with respect to a case of creating a file A, a file B, and a file C on a tape in this order and then updating the file B and the file A in this order. Since normally files on a tape are not overwritten in updating of the files, the file A before the updating and the file B before the updating on the tape are invalidated and then the file B after the updating and the file A after the updating are additionally written in this order subsequently to the file C. In other words, the valid files (not invalidated) on the tape are the file C, the file B, and the file A in this order from the beginning of the tape.

LTFS, however, enumerates files in the order of creation time, instead of the order of update time. Therefore, the files are enumerated in the order of the file A, the file B, and the file C. As a result, if the directory including these files are copied by the drag-and-drop operation or the input operation of the xcopy command, the file A, the file B, and the file C are copied in this order, thereby causing a problem of requiring long time for copying.

To solve this problem, there may be a method of copying the files in the order of recorded locations by using an application dedicated to copying files. This method, however, requires the knowledge of the recorded locations of the files on the tape.

Since LTFS is an open standard format and the format specification thereof is published, it is possible to know the locations on the tape where the files are recorded by the direct reading of the tape by the application. This, however, requires the implementation dependent on a hardware device. Moreover, even if the implementation dependent on the hardware device is performed, files cannot be copied by using very general functions belonging to the OS such as the drag-and-drop and xcopy functions.

Japanese Patent Application Publication No. JP2010-97646A and Japanese Patent Application Publication No. JP02-246075 do not disclose any means for solving the above problems.

An object of the present invention is to perform an access which does not decrease performance specialized for sequential media, without performing implementation dependent on a hardware device on the application side.

In one illustrative embodiment, a method, in a data processing system, is provided for generating enumerated information in which a plurality of files are enumerated except entirely-invalidated files on a sequential medium. The illustrative embodiment acquires management information for managing locations where the plurality of files on the sequential medium are recorded from the sequential medium. The illustrative embodiment generates the enumerated information in which the plurality of files are enumerated in an order according to the locations where the plurality of files are recorded on the basis of the acquired management information.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Hereinafter, preferred embodiments of the present invention will be described in detail in accordance with the accompanying drawings.

In this embodiment of the present invention, files are enumerated in various methods according to options, one of which is selected when a tape is mounted. The methods of enumerating files can be, for example, those corresponding to the representation as described below.

In a first enumeration method, the files in each directory are enumerated in an order starting from the beginning of a tape with the directory structure as it is.

Figure 1:
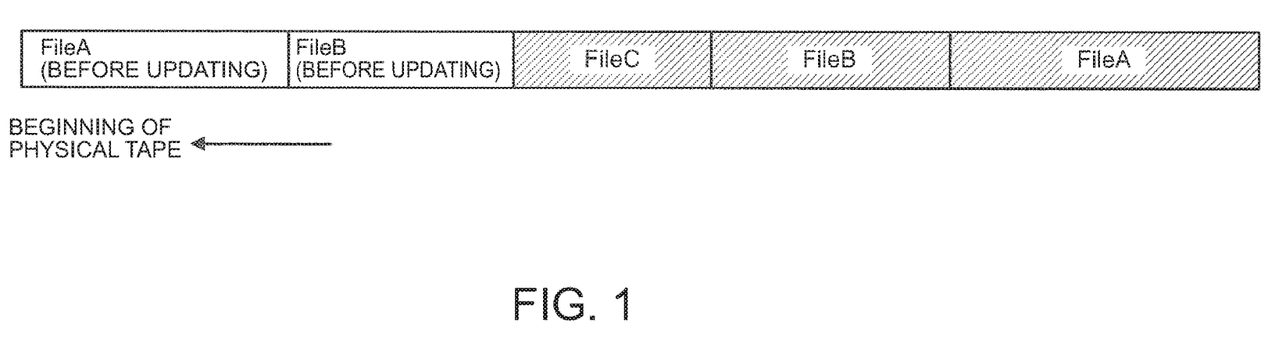
FIG. 1 is a diagram for describing a general operation performed when a first enumeration method is specified in an embodiment of the present invention.

FIG. 1 is a diagram illustrating an arrangement of files on a tape for describing the first enumeration method.

FIG. 1 illustrates a case where three files, FileA, FileB, and FileC are written into the tape in this order and then FileB is updated and thereafter FileA is updated. Normally, if files on a tape are updated, the files are rewritten, instead of overwriting the files. Therefore, in FIG. 1, FileA and FileB are invalidated and FileB and FileA after the updating are added in this order at the back of FileC. Specifically, only the shaded files are valid. In this case, assuming that FileA, FileB, and FileC exist directly under the same directory, FileC, FileB, and FileA are enumerated in this order in the first enumeration method.

In a second enumeration method, in the case where one file is divided into a plurality of fragments on a tape in the first enumeration method, each fragment is given a particular file name and each of the plurality of fragments is treated as one file.

Figure 2:
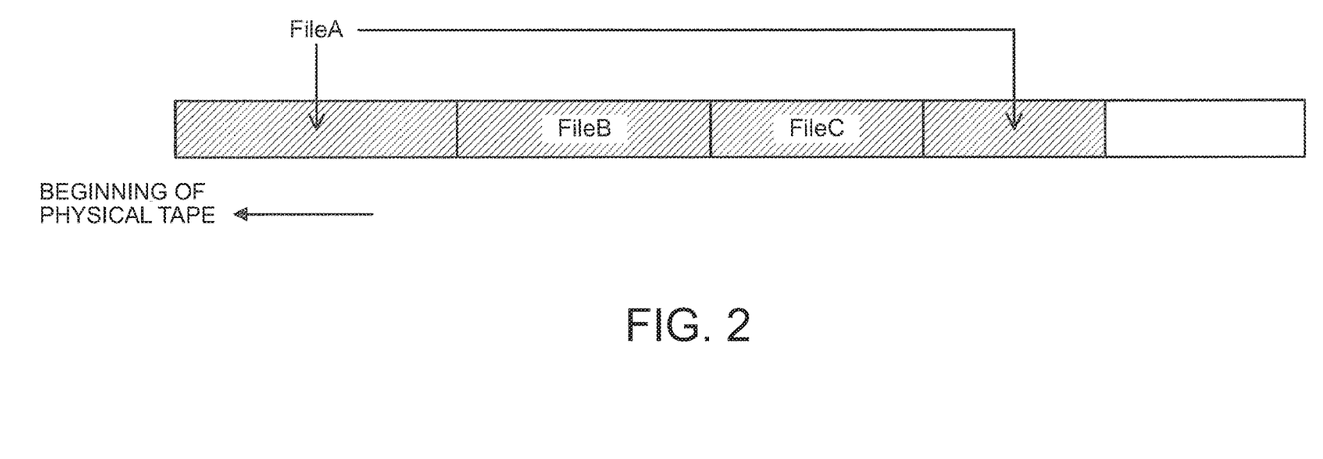
FIG. 2 is a diagram for describing a general operation performed when a second enumeration method is specified in the embodiment of the present invention.

FIG. 2 is a diagram illustrating an arrangement of files on a tape for describing the second enumeration method.

FIG. 2 illustrates a case where three files, FileA, FileB, and FileC are written into a tape in this order and then a part of FileA is updated. Specifically, it is the case where only the updated part of FileA is added at the back of FileC, by which FileA is divided. In this diagram, valid files are shaded, too. In this case, assuming that FileA, FileB, and FileC exist directly under the same directory, four files, FileA~1, FileB, FileC, and FileA~2 are enumerated in this order in the second enumeration method. Although "~" is used for an example of a special character string here, any other character string or any other method for representing may be used.

In a third enumeration method, the directory structure disappears and all files are given file names having a format that suggests a path and arranged directly under the root directory, where the files are enumerated in an order starting from the beginning of a tape.

Figure 3:
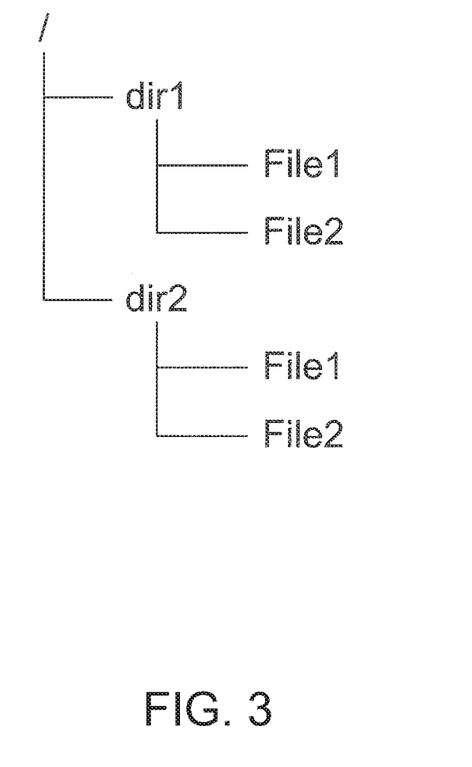
FIG. 3 is a diagram for describing a general operation performed when a third enumeration method is specified in the embodiment of the present invention.

FIG. 3 is a diagram illustrating a directory structure for describing the third enumeration method.

FIG. 3 illustrates a case where two directories, dir1 and dir2 exist under the root directory and two files, File1 and File2 exist under each directory.

For example, if a tape is mounted without options, the representation is as shown. By selecting an option for specifying the third enumeration method when the tape is mounted, however, four files, dir1~~File1, dir1~~File2, dir2~~File1, and dir2~~File2 are enumerated under the root directory. Although "~~" is used for an example of a special character string here, any other character string or any other method for representing may be used.

In a fourth enumeration method, in the case where one file is further divided into a plurality of fragments on a tape in the third enumeration method, a particular file name is given to each fragment and each of the plurality of fragments is treated as a file.

In a fifth enumeration method, files are enumerated in the third enumeration method only under a specific directory specified by an option.

In a sixth enumeration method, files are enumerated in the fourth enumeration method only under a specific directory specified by an option.

In a seventh enumeration method, a special directory is arranged directly under the root directory in a state where a normal directory structure is provided and further a directory is arranged under the special directory in one of the first to sixth enumeration methods.

The following describes a file system which enumerates files in the above enumeration methods in detail.

Figure 4:
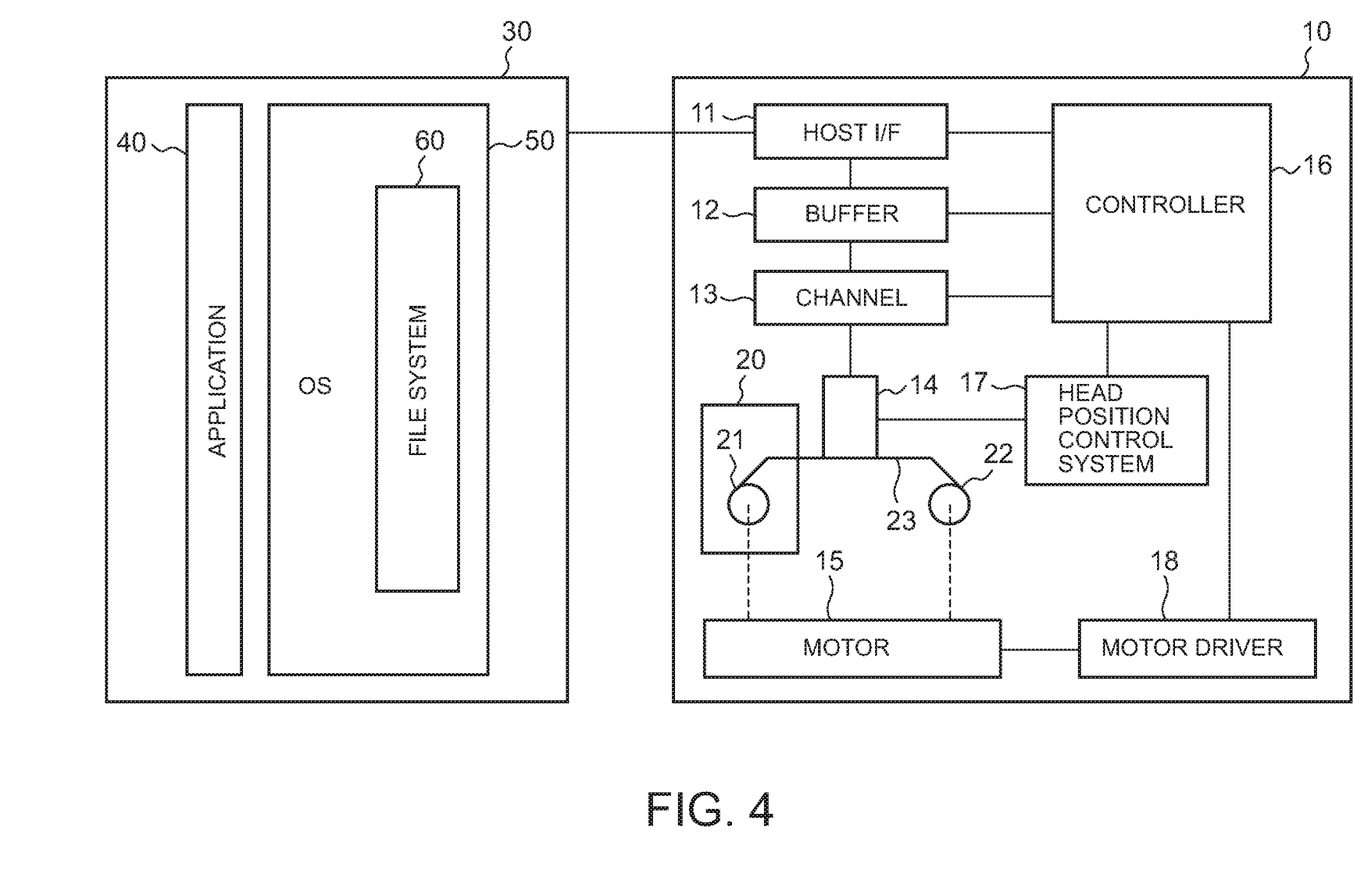
FIG. 4 is a diagram illustrating an overall configuration example of a storage system in the embodiment of the present invention.

FIG. 4 is a diagram illustrating a configuration example of a storage system to which this type of file system is applied.

As shown, the storage system includes a tape drive 10 and a host 30.

The tape drive 10 is an example of a recording device, which includes a host interface (hereinafter, referred to as "host I/F") 11, a buffer 12, a channel 13, a head 14, and a motor 15. In addition, the tape drive 10 includes a controller 16, a head position control system 17, and a motor driver 18. Furthermore, a tape can be mounted into the tape drive 10 by an insertion of a tape cartridge 20 and therefore the tape cartridge 20 is also shown. The tape cartridge 20 includes a tape 23 wound around reels 21 and 22. The tape 23 moves in a longitudinal direction from the reel 21 to the reel 22 or from the reel 22 to the reel 21 along with the rotation of the reels 21 and 22. Although the magnetic tape is illustrated as the tape 23, a tape medium other than the magnetic tape may be used.

Here, the host I/F 11 communicates with the host 30. For example, the host I/F 11 receives a command prompting for writing data from the host 30 to the tape 23, a command causing the tape 23 to move to a target position, a command prompting for reading data from the tape 23 and the like. As a protocol used for this host I/F 11, SCSI is illustrated. In the case of SCSI, a first command corresponds to a Write command, a second command corresponds to a Locate command or a Space command, and a third command corresponds to a Read command. In addition, the host I/F 11 is an example of a transmitting unit and therefore sends back a response indicating whether data read in response to these commands and processing corresponding to these commands are successful or unsuccessful to the host 30.

The buffer 12 is a memory which stores data to be written into the tape 23 or data read from the tape 23. For example, the buffer 12 is built from a dynamic random access memory (DRAM). Moreover, the buffer 12 is composed of a plurality of buffer segments, where each buffer segment stores a dataset, which is a unit for reading/writing to the tape 23.

The channel 13 is a communication channel which is used to send data, which is to be written into the tape 23, to the head 14 or to receive data, which is read from the tape 23, from the head 14.

The head 14 is an example of the writing unit and the reading unit, which writes information into the tape 23 or reads information from the tape 23 when the tape 23 moves in the longitudinal direction.

The motor 15 rotates the reels 21 and 22. Although the motor 15 is represented by one rectangle in FIG. 4, it is preferable to provide one motor for each of the reels 21 and 22, in other words, two motors in total.

The controller 16 controls the entire tape drive 10. For example, the controller 16 controls writing data into the tape 23 and reading data from the tape 23 according to a command received by the host I/F 11. In addition, the controller 16 controls the head position control system 17 and the motor driver 18.

The head position control system 17 controls the head 14 to follow one or a plurality of desired wraps. Here, the term "wrap" means a group of a plurality of tracks on the tape 23. If a wrap needs to be changed, the head 14 also needs to be electrically switched and therefore the head position control system 17 controls the switch operation.

The motor driver 18 drives the motor 15. If two motors 15 are used, two motor drivers 18 are provided as described above.

Moreover, the host 30 is an example of a generating device which generates enumerated information in which a plurality of files are enumerated and includes an application software (hereinafter, simply referred to as "application") 40, an OS 50, and a file system 60.

Here, the application 40 is software which is used for a specific purpose, such as, for example, software for copying a file in a storage into HDD. Taking Windows 7® for example, this type of software includes Explorer®, software operating according to an xcopy command, and the like.

The OS 50 is software which manages the entire operation of the host 30. In this embodiment, the OS 50 particularly receives information in which files are enumerated from the file system 60 and provides the application 40 with the received information. Since an OS has a file system 60 as a function of the OS by the common practice thereof, a part including functions other than the file system 60 among the functions of the OS will be referred here to as "OS 50."

The file system 60 is software which manages files in the storage. The file system 60 sends back information in which files are enumerated in response to an query from the OS 50.

The following describes a hardware configuration of the host 30.

Figure 5:
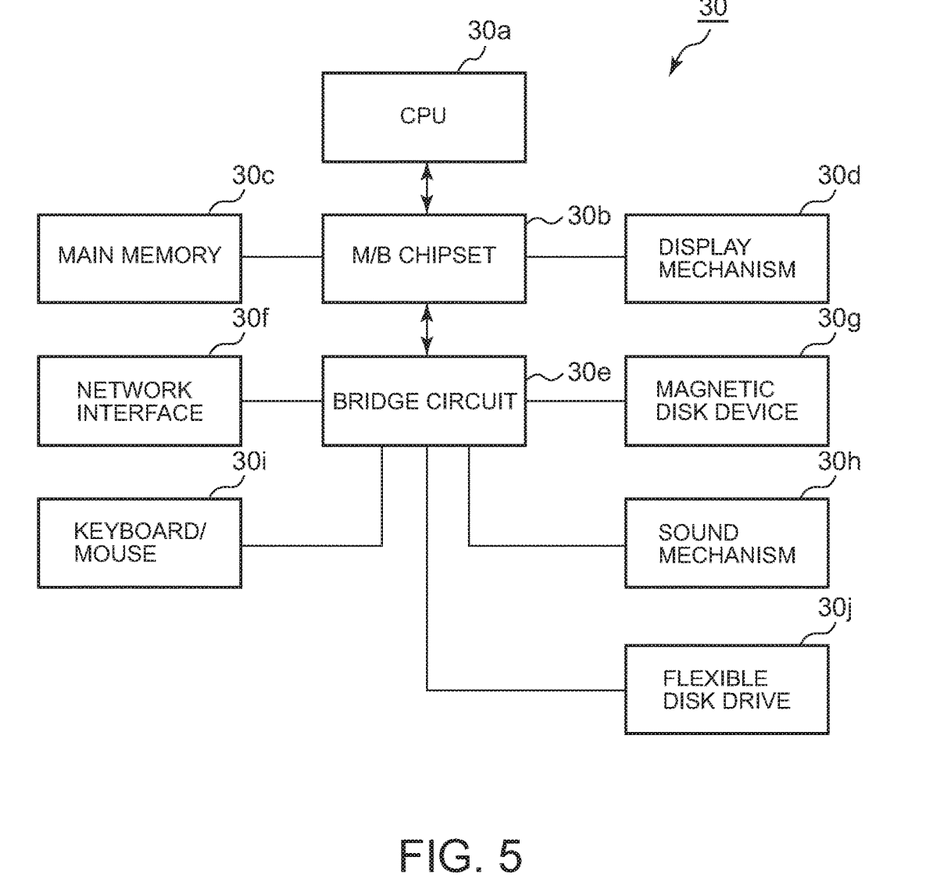
FIG. 5 is a diagram illustrating a hardware configuration example in the embodiment of the present invention.

FIG. 5 is a diagram illustrating a hardware configuration example of the host 30.

As shown, the host 30 includes a central processing unit (CPU) 30a which is a computing means, a main memory 30c connected to the CPU 30a via a motherboard (M/B) chipset 30b, and a display mechanism 30d connected to the CPU 30a via the M/B chipset 30b likewise. In addition, the M/B chipset 30b is connected to a network interface 30f, a magnetic disk device 30g, a sound mechanism 30h, a keyboard/mouse 30i, and a flexible disk drive 30j via a bridge circuit 30e.

In FIG. 5, the respective constituent elements are connected to each other via a bus. For example, the CPU 30a and the M/B chipset 30b or the M/B chipset 30b and the main memory 30c are connected to each other via a CPU bus. In addition, the M/B chipset 30b and the display mechanism 30d may be connected to each other via an accelerated graphics port (AGP). If the display mechanism 30*d* includes a video card supporting PCI Express, however, the M/B chipset 30*b* and the video card are connected to each other via a PCI Express (PCIe) bus. Further, when the bridge circuit 30*e* is connected to the network interface 30*f*, for example, PCI Express may be used. Moreover, when the bridge circuit 30*e* is connected to the magnetic disk device 30*g*, for example, a serial AT attachment (ATA), a parallel transfer ATA, or a peripheral components interconnect (PCI) bus may be used. Furthermore, when the bridge circuit 30*e* is connected to the keyboard/mouse 30*i* or to the flexible disk drive 30*j*, a USB bus may be used.

Subsequently, the functional components of the host 30 will be described. Note that, however, this embodiment is carried out by the file system 60 and therefore only the functional components implemented by the file system 60 will be described below.

Figure 6:
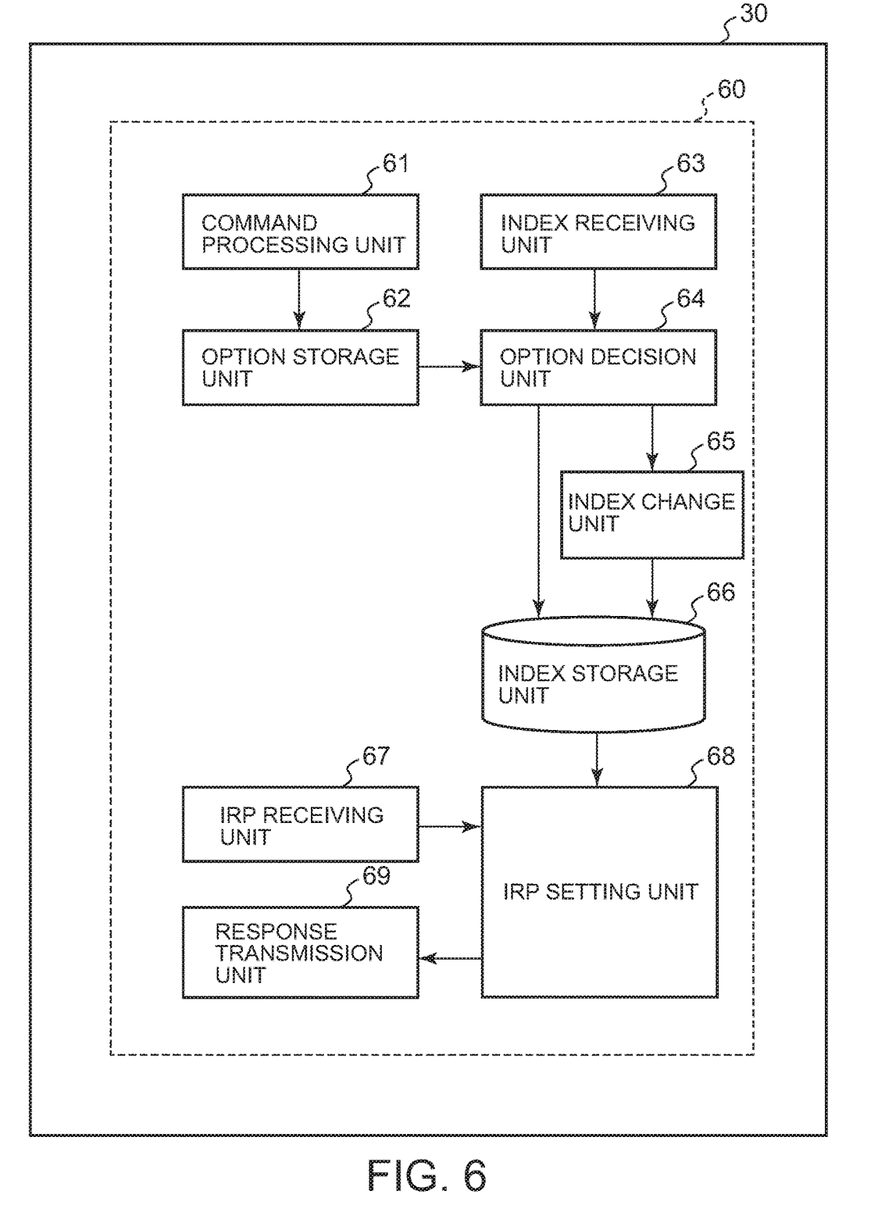
FIG. 6 is a block diagram illustrating a functional configuration example of a host in the embodiment of the present invention.

FIG. 6 is a diagram illustrating the functional configuration example of the host 30.

As shown, the host 30 includes a command processing unit 61, an option storage unit 62, an index receiving unit 63, an option decision unit 64, an index change unit 65, and an index storage unit 66 as functional components implemented by the file system 60. In addition, the host 30 includes an IRP receiving unit 67, an IRP setting unit 68, and a response transmission unit 69.

The command processing unit 61 processes a command prompting for mounting the tape 23 on the tape drive 10. Specifically, the command processing unit 61 retrieves an option specified by a command prompting for mounting the tape 23, first. This option indicates which enumeration method is to be used among the enumeration methods of the first enumeration method to the seventh enumeration method. If the option indicates that the fifth or sixth enumeration method is to be used, it also indicates the directory where files to be enumerated exist. Moreover, the command prompting for mounting the tape 23 is transmitted to the tape drive 10 to perform mount processing. In this embodiment, the command processing unit 61 is provided as an example of an accepting unit which accepts a selected enumeration method.

The option storage unit 62 stores information of the option retrieved by the command processing unit 61.

The index receiving unit 63 receives an index transmitted in response to the command prompting for mounting the tape 23 on the tape drive 10. In this regard, the index is recorded in the tape 23 and therefore the index receiving unit 63 receives the index which has been read from the tape 23 by the tape drive 10. Moreover, the index is information for managing a plurality of files recorded in the tape 23 and includes information such as the file names of the files, the recorded locations of the files, and directories in which the files exist. In this embodiment, the index is used as an example of management information and the index receiving unit 63 is provided as an example of an acquisition unit which acquires the management information and a receiving unit which receives the management information.

The option decision unit 64 decides whether the specified option requires a change in the directory structure or in the file names on the basis of the information of the option stored in the option storage unit 62. If the option decision unit 64 decides that the specified option does not require the change in the directory structure or in the file names, the option decision unit 64 stores the index received by the index receiving unit 63 into the index storage unit 66 as it is. If the option decision unit 64 decides that the specified option requires a change in the directory structure or in the file names, the option decision unit 64 passes the index received by the index receiving unit 63 to the index change unit 65.

The index change unit 65 changes the directory structure or file names managed by the index passed from the option decision unit 64 according to the information of the option stored in the option storage unit 62 and then stores the changed information into the index storage unit 66.

The index storage unit 66 stores the index received by the index receiving unit 63 just as it is or with the index changed by the index change unit 65. In this embodiment, the index storage unit 66 is provided as an example of a storage unit which stores the management information.

The IRP receiving unit 67 receives an IRP from the OS 50.

The IRP setting unit 68 stores the file names within the specified directory into a buffer prepared by the IRP received by the IRP receiving unit 67. If the file names are divided and stored multiple times in the above, first, the IRP setting unit 68 decides whether a first IRP is received or a second or subsequent IRP is received by referring to a parameter Flag of the IRP. If the first IRP is received, the IRP setting unit 68 stores file names in order from a file having zero as a file ID owned by the file system 60 inside thereof. If the second or subsequent IRP is received, the IRP setting unit 68 stores file names in order from a file having a file ID subsequent to the file ID of the file whose file name is stored at receiving the previous IRP. In this case, the file whose file ID is x is assumed to be a file which is determined to be enumerated at the x-th location in consideration of the recorded locations of the files in the tape 23 (for example, a file recorded at the x-th location counted from the beginning of the tape 23). In this embodiment, the file names stored in the buffer prepared by the IRP are used as an example of enumerated information in which the plurality of files are enumerated in the order according to the locations in which the plurality of files are recorded, and the IRP setting unit 68 is provided as an example of a generation unit which generates the enumerated information.

The response transmission unit 69 sends back a status, which is a result of processing in which the IRP setting unit 68 stores the file names into the buffer prepared by the IRP, to the OS 50.

Among these functions, the command processing unit 61, the index receiving unit 63, the option decision unit 64, the index change unit 65, the IRP receiving unit 67, the IRP setting unit 68, and the response transmission unit 69 are implemented by the CPU 30*a* that reads a program stored in the magnetic disk device 30*g* into the main memory 30*c* and executes the program. Moreover, the option storage unit 62 is implemented by, for example, the main memory 30*c* and the index storage unit 66 is implemented by, for example, the magnetic disk device 30*g*.

Subsequently, the operation of the host 30 will be described.

Figure 7:
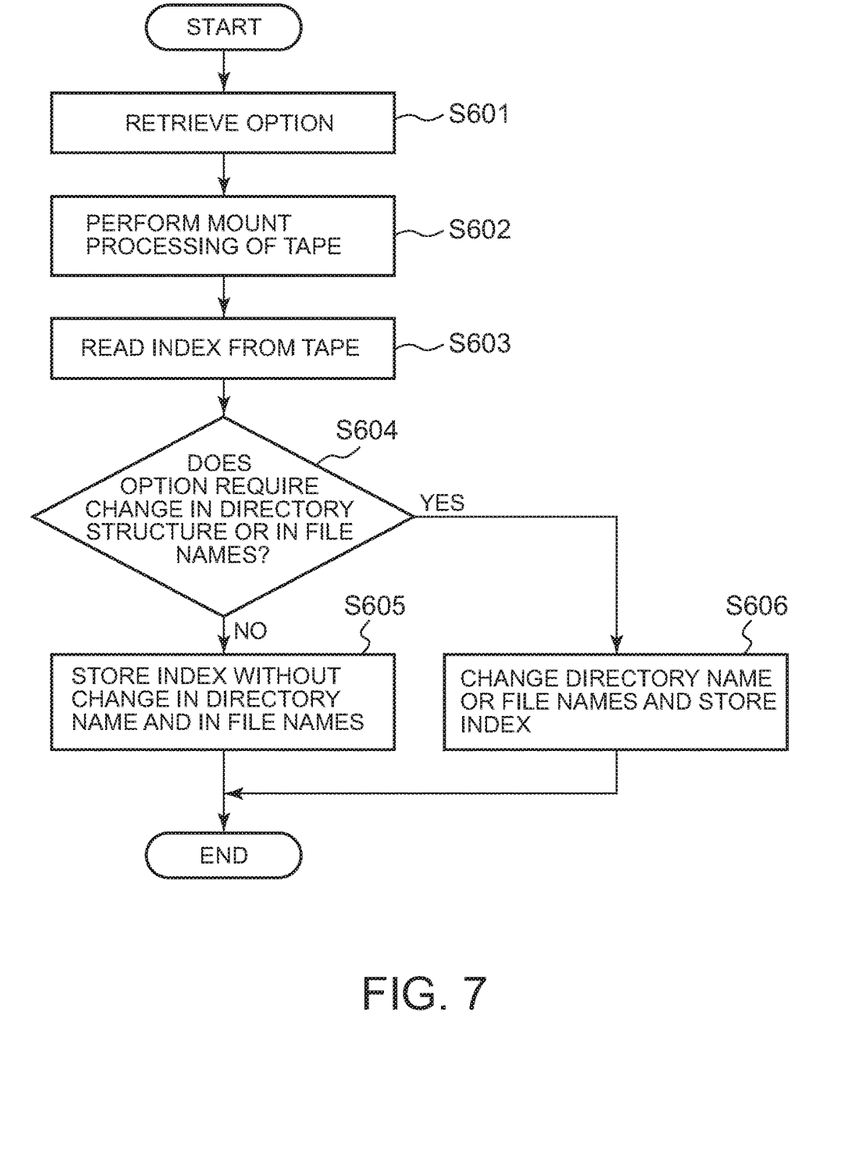
FIG. 7 is a flowchart illustrating an example of an operation performed by the host when a tape is mounted in the embodiment of the present invention.

FIG. 7 is a flowchart illustrating an example of an operation performed by the file system 60 when the tape 23 is mounted.

As shown, in the file system 60, first, the command processing unit 61 retrieves an option according to the command prompting for mounting the tape 23 (step 601). The information of the option retrieved here is stored in the option storage unit 62.

Moreover, the command processing unit 61 performs the mount processing of the tape 23 by transmitting the command prompting for mounting the tape 23 to the tape drive 10 (step 602). Specifically, the command processing unit 61 pulls the tape 23 into the tape drive 10 to enable reading or writing from or to the tape 23.

Thereby, in the tape drive 10, the head 14 reads an index from the tape 23. Then, the index is passed to the host I/F 11 via the channel 13 and the buffer 12 and the host I/F 11 transmits the index to the host 30. Consequently, in the file system 60, the index receiving unit 63 receives the index (step 603).

Subsequently, the option decision unit 64 decides whether the specified option requires a change in the directory structure or in the file names by referring to the information of the option stored in the option storage unit 62 (step 604).

If the option decision unit 64 decides that the specified option does not require a change in the directory structure or in the file names as a result, the index received in step 603 is stored in the index storage unit 66 without changing the directory name or file names (step 605).

For example, there is no change in the directory structure and in the file names in the above first enumeration method. Therefore, if the first enumeration method is specified, the index is stored in the index storage unit 66 just as it is. Moreover, if it is specified that a directory is arranged in the first enumeration method under a special directory in the aforementioned seventh enumeration method, the index is stored in the index storage unit 66 with the content obtained when the directory is arranged in the first enumeration method added to the original content of the index.

On the other hand, if the option decision unit 64 decides that the specified option requires a change in the directory structure or in the file names, the control is transferred to the index change unit 65 and then the index change unit 65 changes the content of the index received in step 603 and stores the content into the index storage unit 66 (step 606).

For example, since the directory structure is changed in the aforementioned third to sixth enumeration methods, the index is stored in the index storage unit 66 with the directory structure changed if one of the third to sixth enumeration methods is specified. Moreover, the file names are changed in the aforementioned second, fourth, and sixth enumeration methods. Therefore, if one of the second, fourth, and sixth enumeration methods is specified, the index is stored in the index storage unit 66 with the file names changed. Furthermore, if it is specified that a directory is arranged in one of the second to sixth enumeration methods under a special directory in the aforementioned seventh enumeration method, the index is stored in the index storage unit 66 with the content obtained when the directory is arranged in one of the first to sixth enumeration methods added to the original content of the index.

FIGS. 8A-8D are diagrams illustrating an example of the content of the index stored in the index storage unit 66 in step 605 or step 606 of FIG. 7. It is assumed here that the files are arranged in the tape 23 as illustrated in FIG. 2 and that the recorded locations of the left fragment of FileA, FileB, FileC, and the right fragment of FileA are denoted by Pos1, Pos2, Pos3, and Pos4, respectively. Moreover, the directory structure set for these files is such that FileA and FileC exist directly under a directory named dir1 and FileB exists directly under a directory named dir2.

Figure 8A:
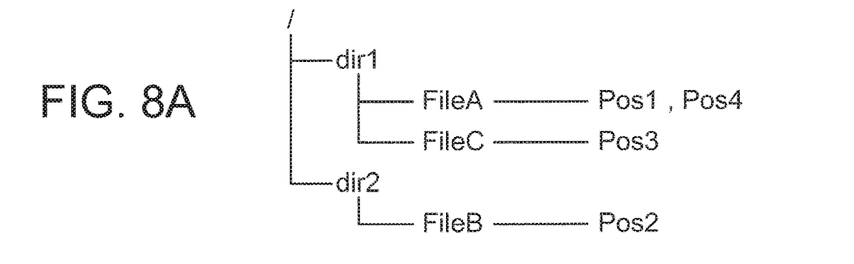
FIGS. 8A-8D are diagrams illustrating an example of information stored in an index storage unit, which is caused by the operation performed by the host when the tape is mounted, in the embodiment of the present invention.

FIG. 8A illustrates an example of the content of an index stored when the first enumeration method is specified.

If the first enumeration method is specified, NO is selected in step 604 in FIG. 7 and therefore the content of the index is not changed. Specifically, in the index, the directory structure and file names are just as they are. Then, a recorded location is defined for each file. Note that, however, FileA is divided into two fragments and therefore two recorded locations Pos1 and Pos4 are defined for FileA.

Figure 8B:
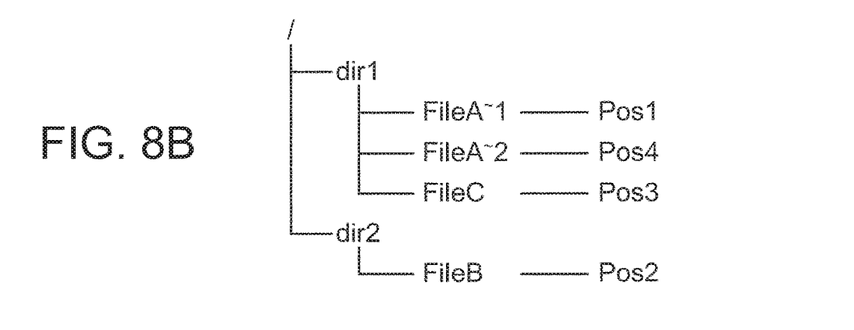

FIG. 8B illustrates an example of the content of an index stored when the second enumeration method is specified.

If the second enumeration method is specified, YES is selected in step 604 in FIG. 7 and therefore the content of the index is changed. Specifically, in the index, the relationship between the directory and the files under the directory is maintained and the fragments of a file are managed as files with file names suggesting the file before the division. Further, the recorded location of each file is defined. Specifically, two fragments obtained by dividing FileA are managed with file names FileA~1 and FileA~2, where the original recorded location Pos1 of the fragment is defined for FileA~1 and the original recorded location Pos4 of the fragment is defined for FileA~2.

Figure 8C:
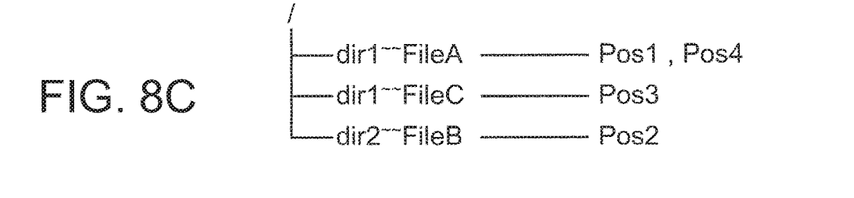

FIG. 8C illustrates an example of an index stored when the third enumeration method is specified.

Also when the third enumeration method is specified, YES is selected in step 604 in FIG. 7 and therefore the content of the index is changed. Specifically, in the index, the directory structure is lost and the files are managed with the file names suggesting a path. Then, a recorded location is defined for each file. Specifically, FileA under dir1 is managed with a file name "dir1~~FileA." Note that, however, the file "dir1~~FileA" is divided into two fragments and therefore two recorded locations Pos1 and Pos4 are defined for dir1~~FileA.

Figure 8D:
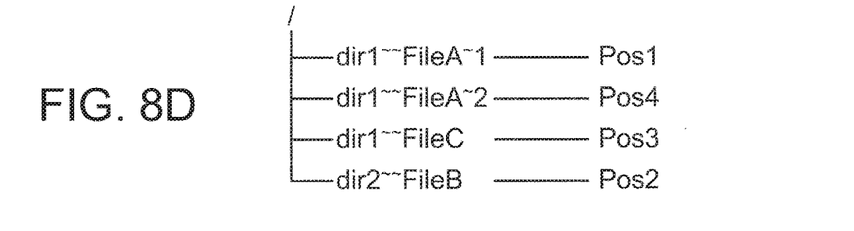

FIG. 8D illustrates an example of the content of an index stored when the fourth enumeration method is specified.

Also when the fourth enumeration method is specified, YES is selected in step 604 in FIG. 7 and therefore the content of the index is changed. Specifically, in the index, the directory structure is lost and the files are managed with the file names suggesting a path, and the fragments of a file are managed as files with file names suggesting the file before the division. Then, a recorded location is defined for each file. Specifically, two fragments obtained by dividing FileA under dir1 are managed with file names dir1~~FileA~1 and dir1~~FileA~2, where the original recorded location Pos1 of the fragment is defined for dir1~~FileA~1 and the original recorded location Pos4 of the fragment is defined for dir1~~FileA~2.

If the fifth enumeration method is specified and if the sixth enumeration method is specified, only the information under the specific directory within the index may be changed as shown in FIG. 8C and FIG. 8D, and therefore the content of the index stored when each of these enumeration methods is specified is not shown.

Moreover, if the seventh enumeration method is specified, the information within the index may be changed to information as shown in one of FIG. 8A to FIG. 8D with the original information left as it is or to information obtained by changing only information under a specific directory as shown in FIG. 8C or 8D. Therefore, the content of the index stored when this enumeration method is specified is not shown, either.

Figure 9:
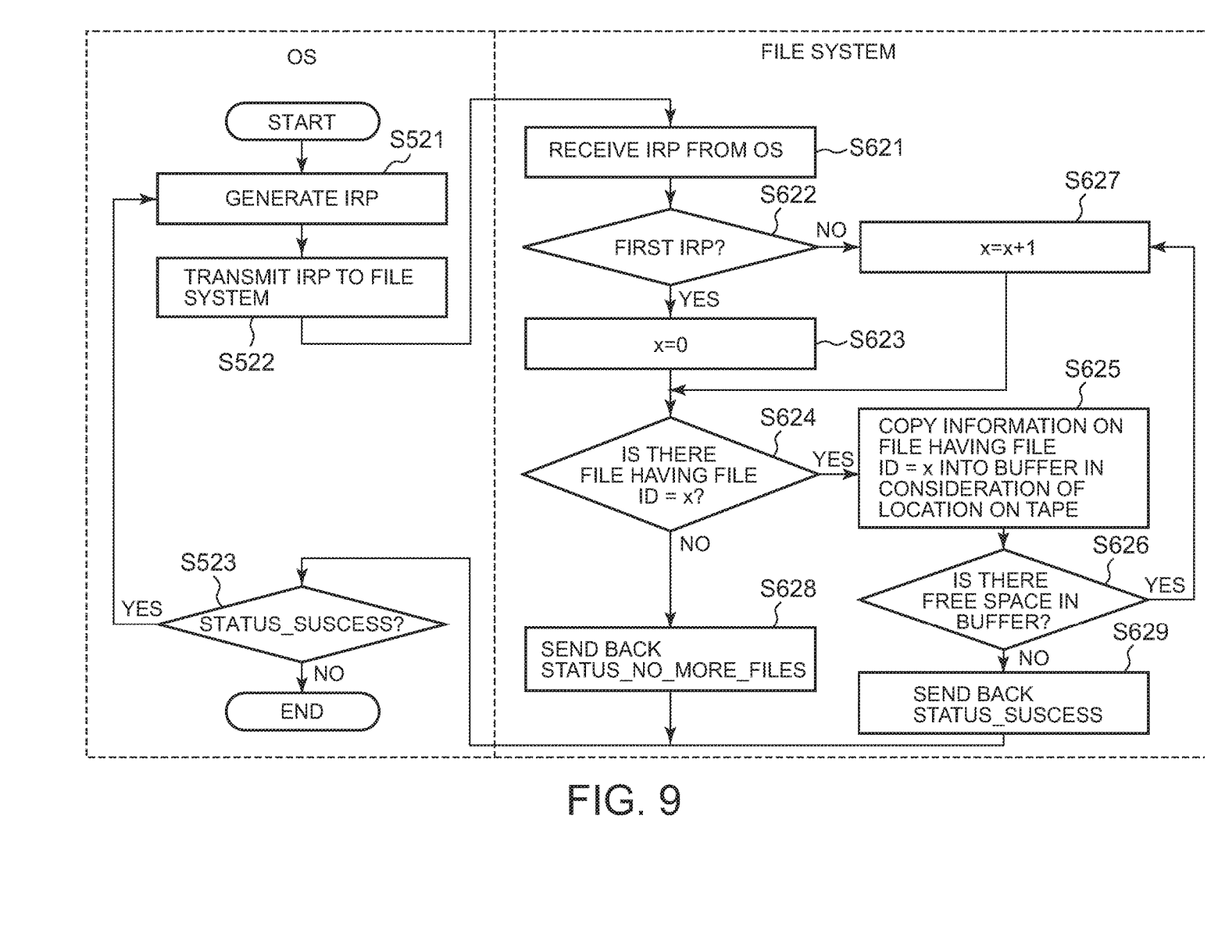
FIG. 9 is a flowchart illustrating an example of an operation performed by the host when files are enumerated in the embodiment of the present invention.

FIG. 9 is a flowchart illustrating an example of the operation of the file system 60 for enumerating files.

First, when the user specifies copying a file by a drag-and-drop operation in Explorer® or an input operation of an xcopy command from a command prompt, the application 40 (Explorer®, xcopy, or the like) queries the OS 50 by calling an API such as FindFirstFile( ), FindNextFile( ).

Then, as shown, the OS 50 generates IRP, IRP_MJ_DIRECTORY_CONTROL (the minor function code is IRP_MN_QUERY_DIRECTORY) (step 521) and transmits the IRP to the file system 60 (step 522). Specifically, the OS 50 queries the file system 60 by using the IRP.

Thereby, in the file system 60, the IRP receiving unit 67 receives the IRP from the OS 50 (step 621).

Thereupon, the IRP setting unit 68 references Flag, which is a parameter of the IRP received by the IRP receiving unit 67, and decides whether the passed IRP is the first IRP or the second or subsequent IRP (step 622).

If it is decided to be the first IRP as a result, the IRP setting unit 68 sets the variable x to zero (step 623). Then, the IRP setting unit 68 decides whether the directory specified by the application 40 contains a file whose file ID used inside the file system 60 is x (in this case, zero) (step 624).

If it is decided that such a file exists, the IRP setting unit 68 copies the file name of the file to the buffer prepared by the IRP (step 625) and decides whether there is any free space in the buffer (step 626). If it is decided that there is any free space in the buffer, the IRP setting unit 68 adds one to the variable x (step 627) and repeats the processing of steps 624 to 626. If it is determined that there is no free space in the buffer, the response transmission unit 69 is informed accordingly and then the response transmission unit 69 sends back a status "STATUS_SUSCESS" to the OS 50 (step 629).

Further, if it is decided that there is no file whose file ID is x within the directory in step 624, the response transmission unit 69 is informed accordingly and then the response transmission unit 69 sends back a status "STATUS_NO_MORE_FILES" to the OS 50 (step 628).

On the other hand, if it is decided that the passed IRP is the second or subsequent IRP in step 622, the IRP setting unit 68 adds one to the last value of the variable x which has been used in the processing by the previous IRP (step 627) and then performs processing of steps 624 to 629.

Thereafter, the OS 50, which has received the status from the response transmission unit 69 of the file system 60, decides whether the status is STATUS_SUSCESS (step 523).

If it is decided that the status is STATUS_SUSCESS as a result, the OS 50 generates an IRP again in step 521 and transmits the IRP to the file system 60 again in step 522.

On the other hand, if it is decided that the status is not STATUS_SUSCESS, in other words, that the status is STATUS_NO_MORE_FILES, the OS 50 terminates the processing. This causes the OS 50 to reference the information in which the file names in the buffer prepared by the IRP are enumerated.

In the above, there has been described an example of the operation to be performed when the API such as FindFirstFile( ), FindNextFile( ) is called by, for example, inputting the xcopy command from a command prompt. The same operation, however, is performed when the API such as FindFirstFile( ), FindNextFile( ) is called in any situation for enumerating files such as, for example, a case where a dir command is input from a command prompt.

In the above example of the operation, a particularly different point from existing operations for enumerating files is to determine the file whose file ID is x according to the recorded location of the file on the tape 23 in step 625. To be more specific, there may be a method in which the order of the recorded locations of the files on the tape 23 is directly used as the order of file IDs, a method in which the order speeding up the reading of the files is calculated from the recorded locations of the files on the tape 23 and then used as the order of file IDs.

In the former method in the above, the files are enumerated in order from the file corresponding to the recorded location closest to the beginning of the tape 23 with reference to the index stored in the index storage unit 66 in step 605 or step 606 of FIG. 7. If a plurality of recorded locations are stored for one file before the enumeration, the order of enumerating the files is determined by using the recorded location closest to the beginning of the tape 23 among the plurality of recorded locations.

For example, if the index as shown in FIG. 8A is stored, the files under dir1 are enumerated in the order of FileA and FileC. If the index as shown in FIG. 8B is stored, the files under dir1 are enumerated in the order of FileA~1, FileC, and FileA~2. If the index as shown in FIG. 8C is stored, the files are enumerated in the order of dir1~~FileA, dir2~~FileB, and dir1~~FileC, independently of whether the files are under dir1 or dir2. Further, if the index as shown in FIG. 8D is stored, the files are enumerated in the order of dir1~~FileA~1, dir2~~FileB, dir1~~FileC, and dir1~~FileA~2, independently of whether the files are under dir1 or dir2.

The above is consistently an example of a case where only a change in the directory name or in the file names is performed as needed when the tape 23 is mounted. For example, if not only the directory name or file names are changed as needed, but also the file names are rearranged in the order according to the recorded locations, the user only needs to retrieve the files in the order in which the files are arranged when enumerating the files.

There may be concern of whether an existing application normally operates in a situation where file names suggesting a file before division are given to the fragments of the file or file names suggesting a path are given to files with a directory structure eliminated as in this embodiment.

This concern, however, is resolved by making coexistence of an access through LTFS and an access through the file system 60 in this embodiment. For example, in Explorer®, an F drive is defined to be accessed through LTFS, a G drive is defined to be accessed through the file system 60 which enumerates files in the first enumeration method, and an H drive is defined to be accessed through the file system 60 which enumerates files in the second enumeration method.

Moreover, although file names suggesting a file before division are given to the fragments of the file when one of the second, fourth, and sixth enumeration methods is specified in this embodiment, the present invention is not limited thereto. File names by which the fragments of the file can be distinguished from each other may be given to the fragments.

Further, although file names suggesting the path of each file are given to the files when one of the third to sixth enumeration methods is specified in this embodiment, the present invention is not limited thereto. File names by which the files can be distinguished from each other may be given to the files.

Moreover, although the tape 23 is taken for example in this embodiment, the present invention is also applicable to any sequentially-accessible sequential medium.

Further, although the entire file or a part thereof is invalidated upon the update of the file and the entire updated file or the updated part of the file is added at the back of the last file in the sequential medium employed in this embodiment, the present invention is not limited thereto. It is possible to use such a sequential medium that, upon the update of a file recorded in a first location, the entire file or a part of the file is invalidated and the entire updated file or the updated part of the file may be recorded in a second location where any other file is not recorded.

In this manner, the file system 60 is modified so that files are enumerated in the order according to the recorded locations on the tape 23. Thereby, the files in the directory are copied at high speed, independently of the recorded locations on the tape 23, while the directory can be copied with a simple operation such as dragging and dropping in Explorer® or inputting the xcopy command from a command prompt.

Further, in this embodiment, when the second enumeration method is specified, the fragments of a file are treated as separate files and files including these files are enumerated in the order according to the recorded locations on the tape 23. Thereby, even if a file is divided, the files in the directory are copied at high speed, independently of the recorded locations on the tape 23 by a simple script. If files are enumerated for a virus scan, particularly the second enumeration method is effective by using virus software which reads a part of each file and is able to detect that the file has a virus, if so.

Furthermore, in this embodiment, when the third enumeration method or the fourth enumeration method is specified, the files under a plurality of directories are arranged flat and these files are enumerated in the order according to the recorded locations on the tape 23. Thereby, even in the case of copying a plurality of directories, the files in the plurality of directories are copied at high speed, independently of the recorded locations on the tape 23, with a simple script. If files are enumerated for a virus scan, the third enumeration method or the fourth enumeration method is effective by using virus software which performs a virus scan for all files on LTFS under a certain directory and then for all files on LTFS under another directory in this order.

Still further, in this embodiment, when the fifth enumeration method or the sixth enumeration method is specified, files are enumerated in the third enumeration method or the fourth enumeration method only with respect to a certain directory. Thereby, only files within a desired directory are copied at high speed, independently of the recorded locations on the tape 23. The third enumeration method or the fourth enumeration method is effective when only files under a specific directory are required to be enumerated in a desired method.

Here, the present invention may be implemented by hardware only or software only. Moreover, the present invention may be implemented by a combination of hardware and software. Moreover, the present invention may be implemented by a computer, a data processing system, or a computer program. This computer program may be stored in a computer-readable medium and be provided. Here, the medium may be an electronic, magnetic, optical, electromagnetic, infrared, or semiconductor system (device or equipment) or a propagation medium. In addition, the computer-readable medium may be a semiconductor, a solid-state storage device, a magnetic tape, a removable computer diskette, a random access memory (RAM), a read-only memory (ROM), a rigid magnetic disk, or an optical disk, for example. The example of the optical disk at this time includes a compact disk read-only memory (CD-ROM), a compact disk read/write (CD-R/W), and a DVD.

While the present invention has been described by using the embodiments, the technical scope of the present invention is not limited to the description of the aforementioned embodiments. It is obvious to persons skilled in the art that various changes or alternative embodiments can be employed without departing from the spirit and scope of the present invention.

The invention claimed is:

1. A method, in a data processing system, for generating enumerated information in which a plurality of files are enumerated except entirely-invalidated files on a sequential medium, the method comprising:
   responsive to a mounting of the sequential medium in the data processing system, identifying an enumeration method from a plurality of different enumeration methods for enumerating the plurality of files on the sequential medium;
   storing the identified enumeration method for use in generating the enumerated information in which the plurality of files are enumerated;
   acquiring management information for managing locations where the plurality of files on the sequential medium are recorded from the sequential medium; and
   generating the enumerated information in which the plurality of files are enumerated in an order according to the locations where the plurality of files are recorded on the basis of the acquired management information and using the identified enumeration method, wherein at least one file in the plurality of files is a fragmented file existing in at least two locations and wherein each file in the plurality of files is recorded on the basis of the identified enumeration method identifying a root directory.

2. The method of claim 1, wherein, upon update of a file recorded in a first location, at least a part of the file is invalidated and wherein at least the part of the updated file is recorded in a second location in which any other file is not recorded thereby forming the fragmented file.

3. The method of claim 1, wherein each file in the plurality of files is named based on:
   responsive to the file being an unfragmented file, a directory in which the file is located, a file name for the file, and a location of the file, or
   responsive to the file being the fragmented file, a directory in which the file is located, a file name for the file, and the at least two locations of the file.

4. The method of claim 1, wherein each file in the plurality of files is named based on:
   responsive to the file being an unfragmented file, a directory in which the file is located, the file name of the file, and a location of the file, or
   responsive to the file being the fragmented file, the directory in which the file is located, the file name of the file, and a modified file name, wherein the modified file name comprises the file name of the file, an indication of a fragment number, and a location of the fragment.

5. A computer program product for generating enumerated information in which a plurality of files are enumerated except entirely-invalidated files on a sequential medium comprising a computer readable medium having a computer readable program stored therein, wherein the computer readable program, when executed on a computing device, causes the computing device to:
   responsive to a mounting of the sequential medium in the data processing system, identify an enumeration method from a plurality of different enumeration methods for enumerating the plurality of files on the sequential medium;
   store the identified enumeration method for use in generating the enumerated information in which the plurality of files are enumerated;

acquire management information for managing locations where the plurality of files on the sequential medium are recorded from the sequential medium; and generate the enumerated information in which the plurality of files are enumerated in an order according to the locations where the plurality of files are recorded on the basis of the management information and using the identified enumeration method, wherein at least one file in the plurality of files is a fragmented file existing in at least two locations and wherein each file in the plurality of files is recorded on the basis of the identified enumeration method identifying a root directory.

6. The computer program product of claim 5, wherein, upon update of a file recorded in a first location, at least a part of the file is invalidated and wherein at least the part of the updated file is recorded in a second location in which any other file is not recorded thereby forming the fragmented file.

7. The computer program product of claim 5, wherein each file in the plurality of files is named based on:

responsive to the file being an unfragmented file, a directory in which the file is located, a file name for the file, and a location of the file, or responsive to the file being the fragmented file, a directory in which the file is located, a file name for the file, and the at least two locations of the file.

8. The computer program product of claim 5, wherein each file in the plurality of files is named based on:

responsive to the file being an unfragmented file, a directory in which the file is located, the file name of the file, and a location of the file, or responsive to the file being the fragmented file, the directory in which the file is located, the file name of the file, and a modified file name, wherein the modified file name comprises the file name of the file, an indication of a fragment number, and a location of the fragment.

9. A system for generating enumerated information in which a plurality of files are enumerated except entirely-invalidated files on a sequential medium, the system comprising:

a processor; and a memory coupled to the processor, wherein the memory comprises instructions which, when executed by the processor, cause the processor to:

responsive to a mounting of the sequential medium in the data processing system, identify an enumeration method from a plurality of different enumeration methods for enumerating the plurality of files on the sequential medium;

store the identified enumeration method for use in generating the enumerated information in which the plurality of files are enumerated;

acquire management information for managing locations where the plurality of files on the sequential medium are recorded from the sequential medium; and generate the enumerated information in which the plurality of files are enumerated in an order according to the locations where the plurality of files are recorded on the basis of the management information and using the identified enumeration method, wherein at least one file in the plurality of files is a fragmented file existing in at least two locations and wherein each file in the plurality of files is recorded on the basis of a the identified enumeration method identifying root directory.

10. The system of claim 9, wherein, upon update of a file recorded in a first location, at least a part of the file is invalidated and wherein at least the part of the updated file is recorded in a second location in which any other file is not recorded thereby forming the fragmented file.

11. The system of claim 9, wherein each file in the plurality of files named based on:

responsive to the file being an unfragmented file, a directory in which the file is located, a file name for the file, and a location of the file, or responsive to the file being the fragmented file, a directory in which the file is located, a file name for the file, and the at least two locations of the file.

12. The system of claim 9, wherein each file in the plurality of files is named based on:

responsive to the file being an unfragmented file, a directory in which the file is located, the file name of the file, and a location of the file, or responsive to the file being the fragmented file, the directory in which the file is located, the file name of the file, and a modified file name, wherein the modified file name comprises the file name of the file, an indication of a fragment number, and a location of the fragment.

\* \* \* \* \*